US010032375B2

(12) United States Patent
Muto et al.

(10) Patent No.: US 10,032,375 B2
(45) Date of Patent: Jul. 24, 2018

(54) APPARATUS, SYSTEM, AND METHOD FOR PROVIDING TRAFFIC INFORMATION

(71) Applicant: Hitachi, Ltd., Chiyoda-ku, Tokyo (JP)

(72) Inventors: Kazuo Muto, Tokyo (JP); Ichiro Kataoka, Tokyo (JP); Takashi Okada, Tokyo (JP); Toshiharu Sugawara, Tokyo (JP); Atsushi Katou, Tokyo (JP); Katsuhiro Samizo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/297,786

(22) Filed: Oct. 19, 2016

(65) Prior Publication Data
US 2017/0116856 A1    Apr. 27, 2017

(30) Foreign Application Priority Data
Oct. 27, 2015    (JP) .................. 2015-210558

(51) Int. Cl.
*B60Q 1/00* (2006.01)
*G08G 1/137* (2006.01)
(Continued)

(52) U.S. Cl.
CPC ............. *G08G 1/137* (2013.01); *B60W 50/14* (2013.01); *G08G 1/162* (2013.01); *G08G 1/163* (2013.01);
(Continued)

(58) Field of Classification Search
CPC .......... A61N 2005/1087; A61N 5/1049; A61N 2005/1061; A61N 5/1081;
(Continued)

(56) References Cited

U.S. PATENT DOCUMENTS 3,574,283 A * 4/1971 Albers ...................... G01S 1/02
340/980
5,949,908 A * 9/1999 Sugahara ............. H04N 19/139
375/E7.129
(Continued)

FOREIGN PATENT DOCUMENTS

JP    2010-244478 A    10/2010

*Primary Examiner* — Daniel Previl
(74) *Attorney, Agent, or Firm* — Crowell & Moring LLP

(57) ABSTRACT

The invention is to specify a poor visibility portion by using only a sensor standardly mounted on a connected car without any special measurement device or equipment and provide information thereon to a driver or an automatic driving device. A traffic information providing apparatus includes a data reception unit for receiving sensor data from a plurality of connected cars, a moving object detection/loss position calculation unit for calculating at least a position where the sensor has detected or lost a moving object on the basis of the sensor data of the connected cars, an information addition unit for adding a calculation result obtained by the moving object detection/loss position calculation unit to map information, a driver assistance information preparation unit for preparing driver assistance information on the basis of the map information to which information has been added by the information addition unit, and a data transmission unit for transmitting the driver assistance information prepared by the driver assistance information preparation unit to connected cars.

15 Claims, 18 Drawing Sheets

(51) Int. Cl.
*B60W 50/14* (2012.01)
*G08G 1/16* (2006.01)
*H04L 29/08* (2006.01)

(52) U.S. Cl.
CPC ............ *G08G 1/166* (2013.01); *G08G 1/167* (2013.01); *B60W 2050/146* (2013.01); *H04L 67/12* (2013.01)

(58) Field of Classification Search
CPC .... A61N 2005/1054; A61N 2005/1051; A61N 5/1037; A61N 2005/1095; A61N 5/1067; A61N 5/107; A61N 2005/1097; A61N 5/1039; A61N 5/1044
USPC ................ 340/435, 990, 995, 436, 438–439, 340/463–464, 488, 539.2, 539.22, 340/910–920
See application file for complete search history.

(56) References Cited

U.S. PATENT DOCUMENTS

| | | | | |
|---|---|---|---|---|
| 6,138,073 A * | 10/2000 | Uchigaki | ........... | G01C 21/3611 701/410 |
| 6,186,953 B1 * | 2/2001 | Narimatsu | ......... | A61B 5/02125 128/925 |
| 6,229,825 B1 * | 5/2001 | Nitta | ................... | H04L 12/1813 370/498 |

* cited by examiner

[FIG. 1]
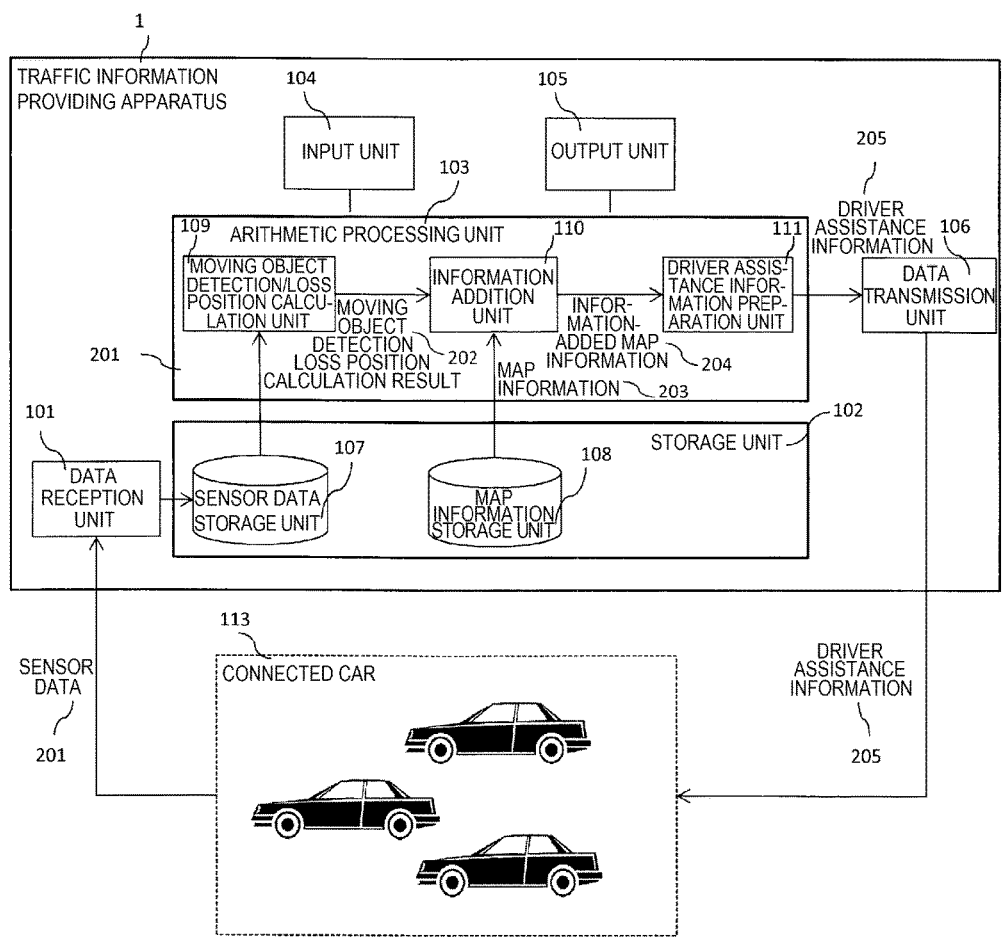

[FIG. 2]
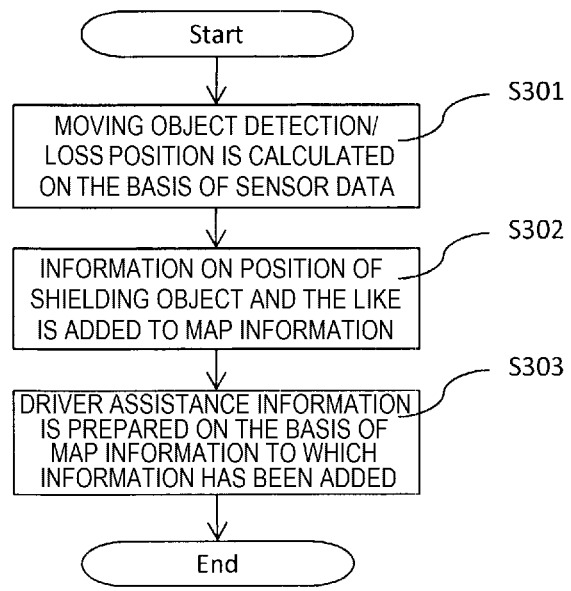

[FIG. 4]
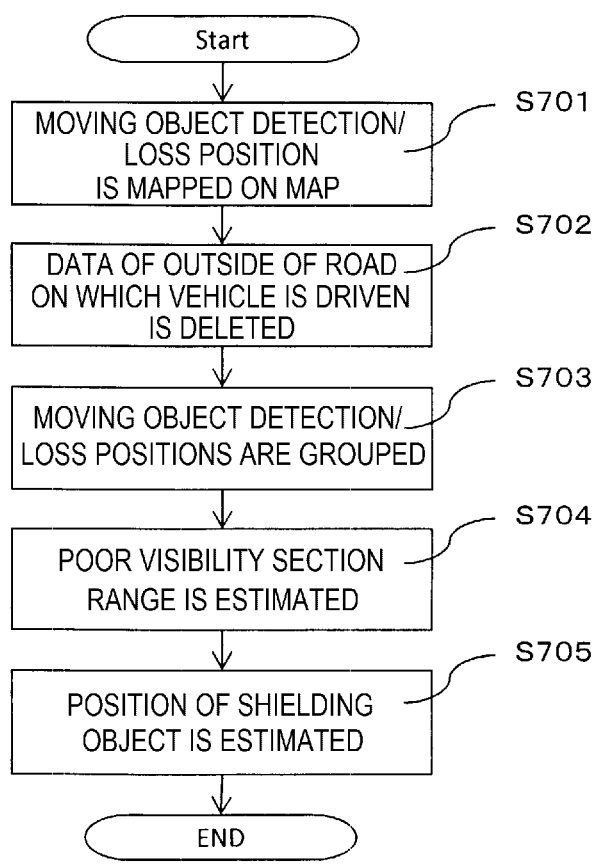

[FIG. 5]
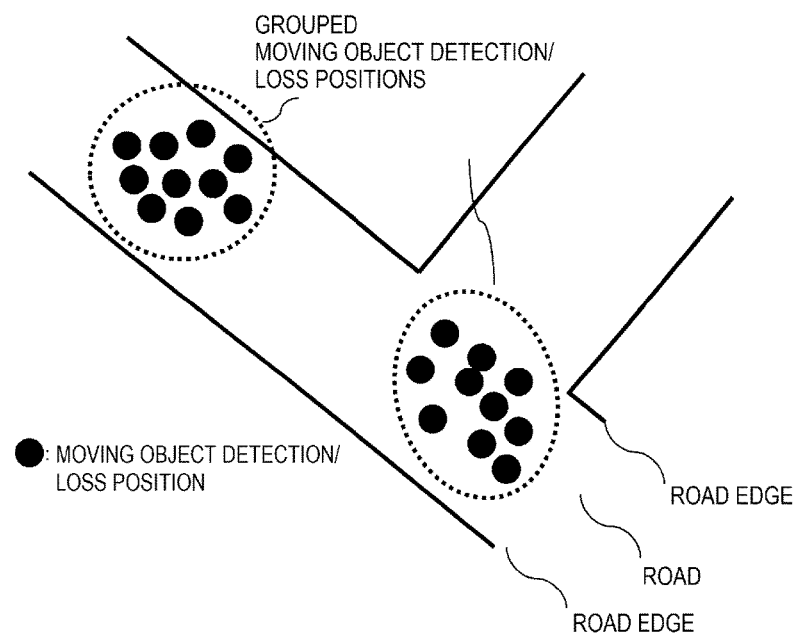

[FIG. 6]
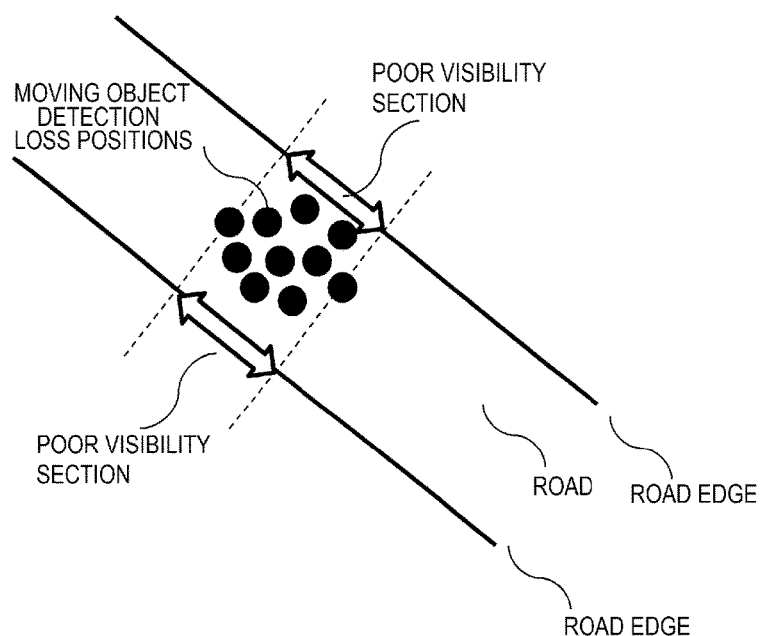

[FIG. 8]
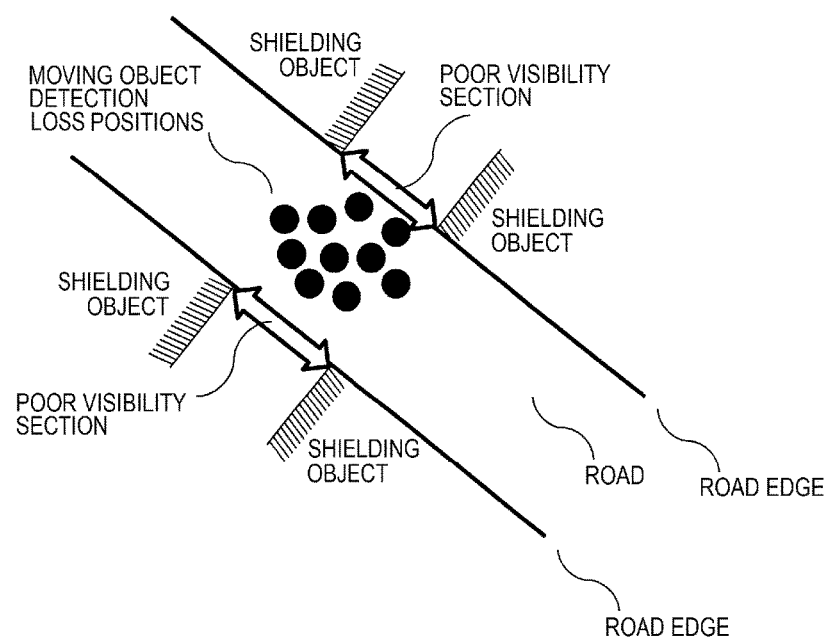

[FIG. 10]
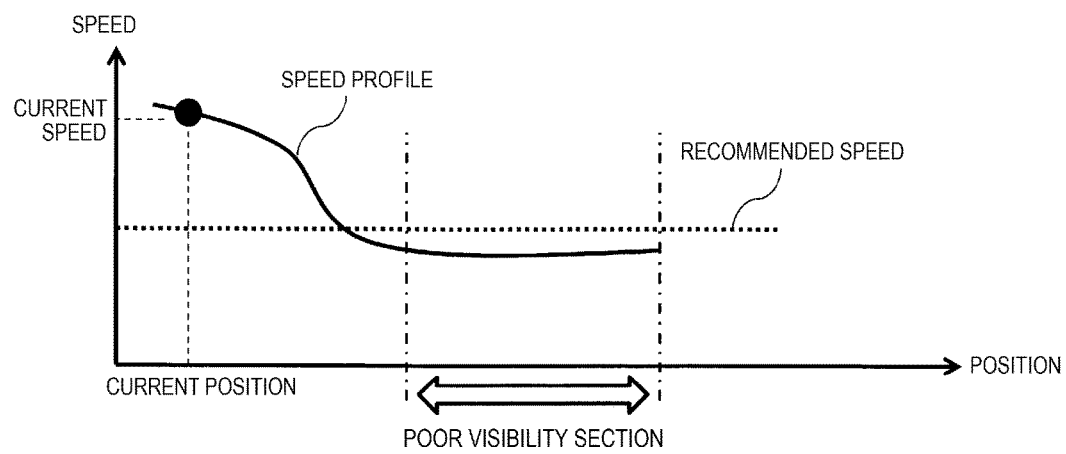

[FIG. 11]
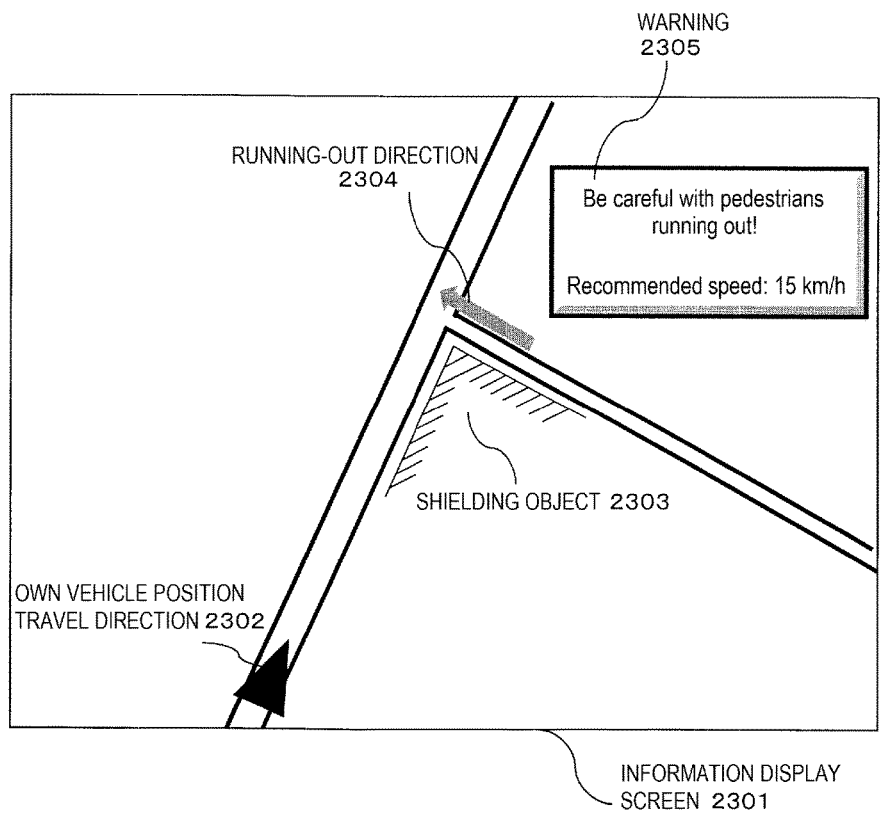

[FIG. 12]
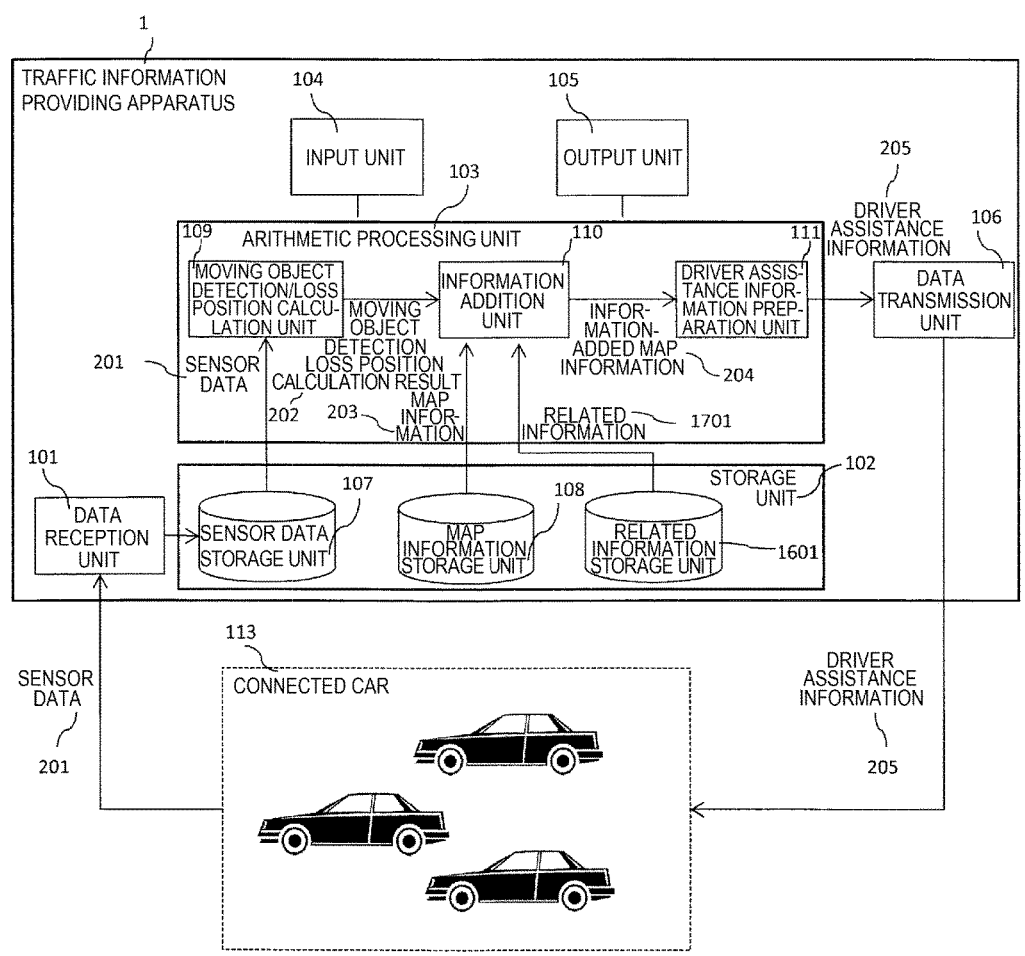

[FIG. 13]
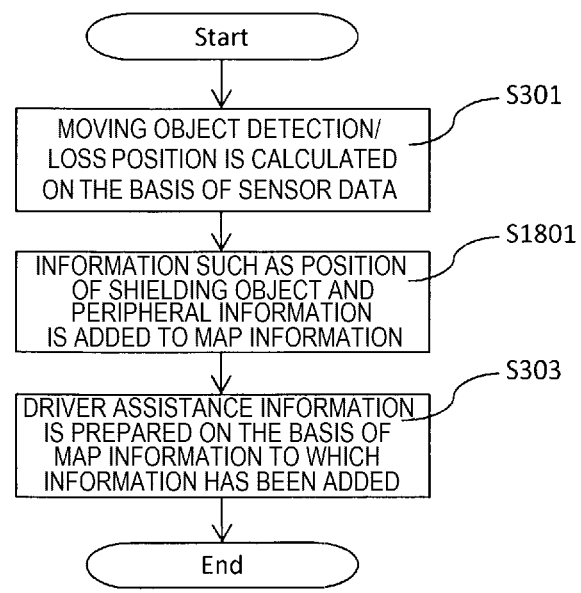

[FIG. 14]
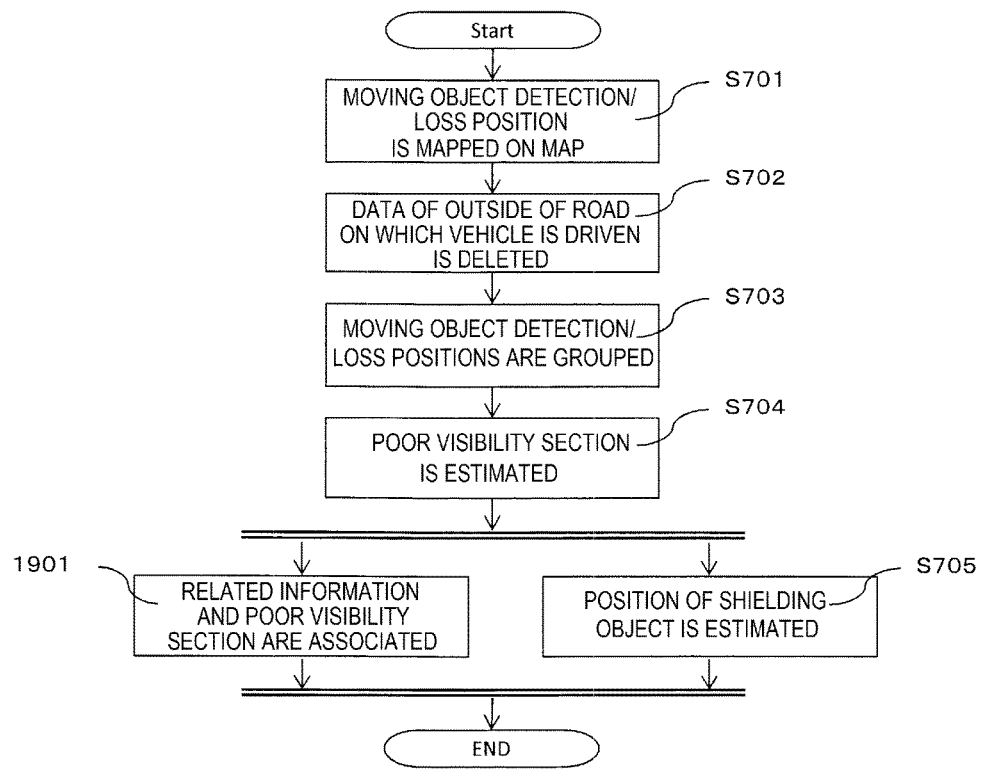

[FIG. 15]
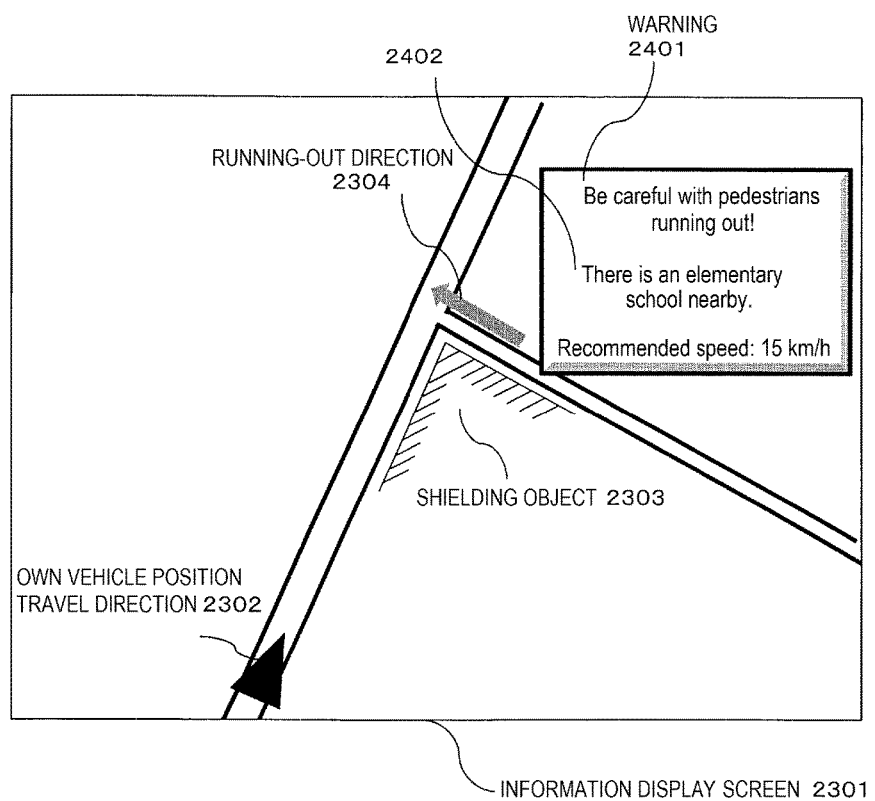

[FIG. 16]
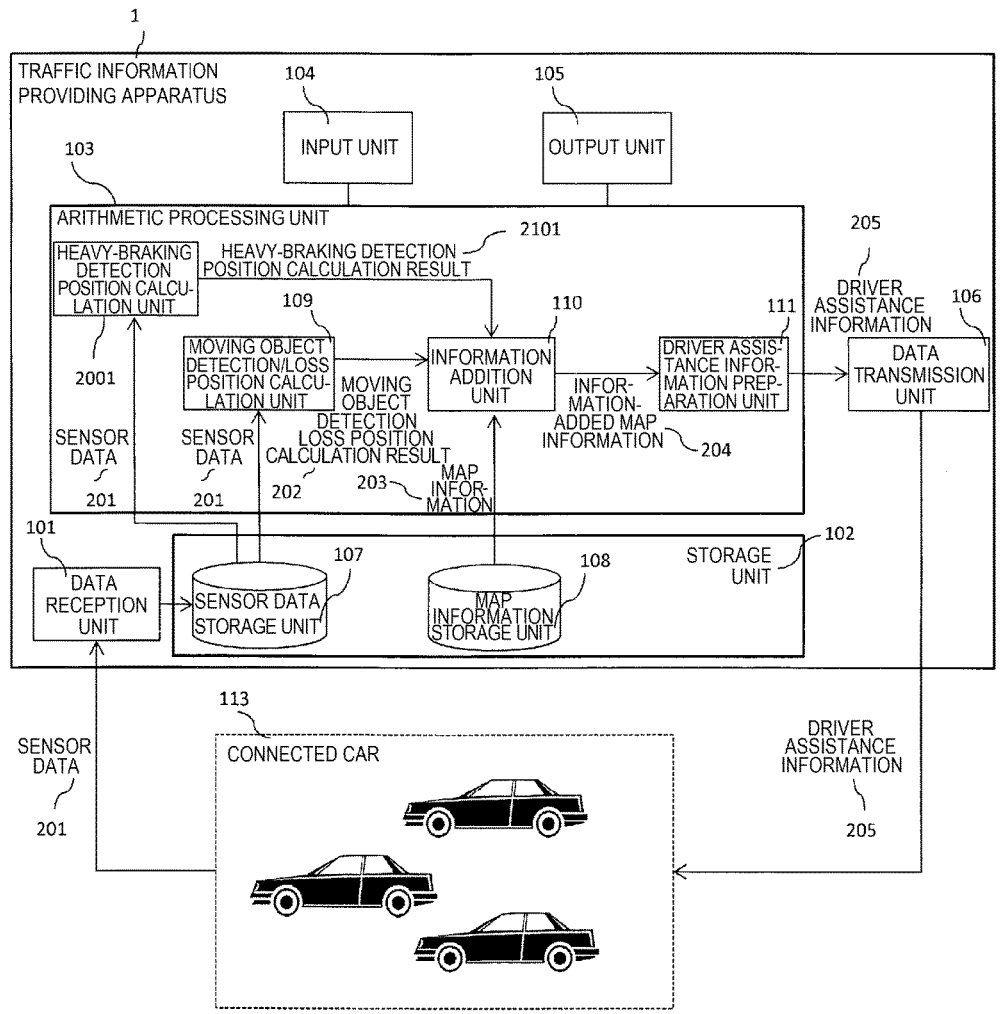

[FIG. 17]
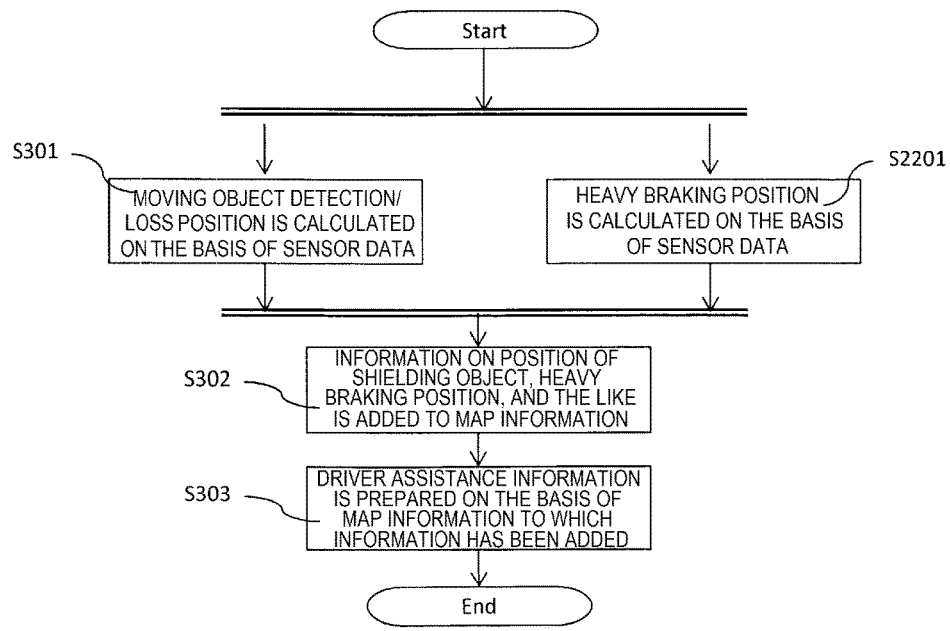

[FIG. 18]
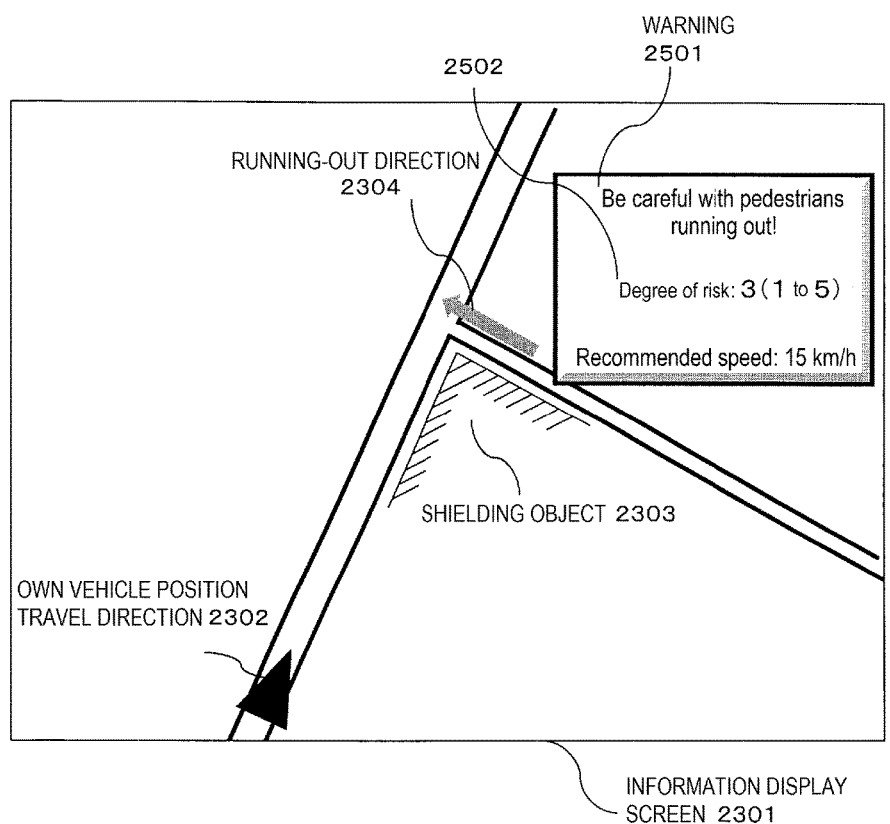

APPARATUS, SYSTEM, AND METHOD FOR PROVIDING TRAFFIC INFORMATION

TECHNICAL FIELD

The present invention relates to an apparatus, system, and method for providing traffic information.

BACKGROUND ART

In order to realize safe and secure automatic driving and advanced driver assistance, it is necessary not only to drive on a road within a legal speed limit, but also to recognize, for example, an intersection with poor visibility in advance and preliminarily decelerate in the vicinity thereof so as to easily avoid a person or a vehicle if the person or the vehicle suddenly runs out into the intersection.

PTL 1 proposes a vehicle driving operation assistance device that "increases a reaction force to be applied to an accelerator pedal by a reaction force application unit when a visual field shielding object that is an object shielding a visual field of a driver is recognized via a radar and therefore can cause the driver to physically perceive a lack of safety check" (Abstract).

CITATION LIST

Patent Literature

PTL 1: JP-A-2010-244478

SUMMARY OF INVENTION

Technical Problem(s)

In a method of PTL 1, the radar recognizes the shielding object and then the driver is notified of existence of the shielding object, and therefore preliminary deceleration is difficult in some cases.

Meanwhile, diffusion of connected cars which are automobiles constantly connected to the Internet and including many sensors is expected in the future.

In view of the above points, an object of the invention is to prepare traffic information on the basis of sensor data obtained from connected cars and provide the traffic information to automobiles.

Solution to Problem(s)

According to a first solution of the invention, there is provided a traffic information providing apparatus, including:

a moving object detection/loss position calculation unit for calculating a plurality of moving object detection/loss positions on the basis of detection and loss data of moving objects received from vehicles by using one or plurality of sensors;

an information addition unit for preparing information-added map information by obtaining a poor visibility section along a road and a position of a shielding object on the outside of the road on the basis of a plurality of moving object detection/loss positions on the road among the plurality of moving object detection/loss positions calculated by the moving object detection/loss position calculation unit and adding the poor visibility section and the position of the shielding object to map information stored in advance; and a driver assistance information preparation unit for preparing driver assistance information containing the poor visibility section and/or the position of the shielding object and warning information in the poor visibility section on the basis of the information-added map information prepared by the information addition unit.

According to a second solution of the invention, there is provided a traffic information providing system, including:

a data reception unit for receiving sensor data from vehicles;

a map information storage unit for storing map information;

a processing unit for receiving the sensor data from the data reception unit as input, receiving the map information from the map information storage unit as input, and preparing driver assistance information; and a data transmission unit for visibly displaying and/or audibly displaying the driver assistance information prepared by the processing unit on a target vehicle, in which the processing unit includes a moving object detection/loss position calculation unit for calculating a plurality of moving object detection/loss positions on the basis of detection and loss data of moving objects received from the vehicles by using one or plurality of sensors, an information addition unit for preparing information-added map information by obtaining a poor visibility section along a road and a position of a shielding object on the outside of the road on the basis of a plurality of moving object detection/loss positions on the road among the plurality of moving object detection/loss positions calculated by the moving object detection/loss position calculation unit and adding the poor visibility section and the position of the shielding object to the map information stored in advance, and a driver assistance information preparation unit for preparing the driver assistance information containing the poor visibility section and/or the position of the shielding object and warning information in the poor visibility section on the basis of the information-added map information prepared by the information addition unit.

According to a third solution of the invention, there is provided a traffic information providing method, including:

calculating a plurality of moving object detection/loss positions on the basis of detection and loss data of moving objects received from vehicles by using one or plurality of sensors;

preparing information-added map information by obtaining a poor visibility section along a road and a position of a shielding object on the outside of the road on the basis of a plurality of moving object detection/loss positions on the road among the plurality of moving object detection/loss positions and adding the poor visibility section and the position of the shielding object to map information stored in advance; and preparing driver assistance information containing the poor visibility section and/or the position of the shielding object and warning information in the poor visibility section on the basis of the information-added map information.

Advantageous Effects of Invention

According to the invention, it is possible to prepare traffic information on the basis of sensor data obtained from connected cars and provide the traffic information to automobiles.

BRIEF DESCRIPTION OF DRAWINGS

FIG. 1 shows a configuration of Embodiment 1 of a traffic information providing apparatus according to the invention.

FIG. 2 shows a flow of processing in Embodiment 1 of the traffic information providing apparatus according to the invention.

FIG. 4 shows a flow of processing in Step S302.

FIG. 5 illustrates processing in Step S703.

FIG. 6 is a view (1) illustrating processing in Step S704.

FIG. 8 is a view (1) illustrating processing in Step S705.

FIG. 10 shows generation of a speed profile.

FIG. 11 illustrates an example of display of driver assistance information 205 output by the traffic information providing apparatus in Embodiment 1 according to the invention on an information display screen included in a connected car.

FIG. 12 shows a configuration of Embodiment 2 of the traffic information providing apparatus according to the invention.

FIG. 13 shows a flow of processing in Embodiment 2 of the traffic information providing apparatus according to the invention.

FIG. 14 shows a flow of processing in Step S1801.

FIG. 15 illustrates an example of display of driver assistance information 205 output by the traffic information providing apparatus in Embodiment 2 according to the invention on an information display screen included in a connected car.

FIG. 16 shows a configuration of Embodiment 3 of the traffic information providing apparatus according to the invention.

FIG. 17 shows a flow of processing in Embodiment 3 of the traffic information providing apparatus according to the invention.

FIG. 18 illustrates an example of display of driver assistance information 205 output by Embodiment 3 of the traffic information providing apparatus according to the invention on an information display screen included in a connected car.

DESCRIPTION OF EMBODIMENTS

Figures 3A, 3B:
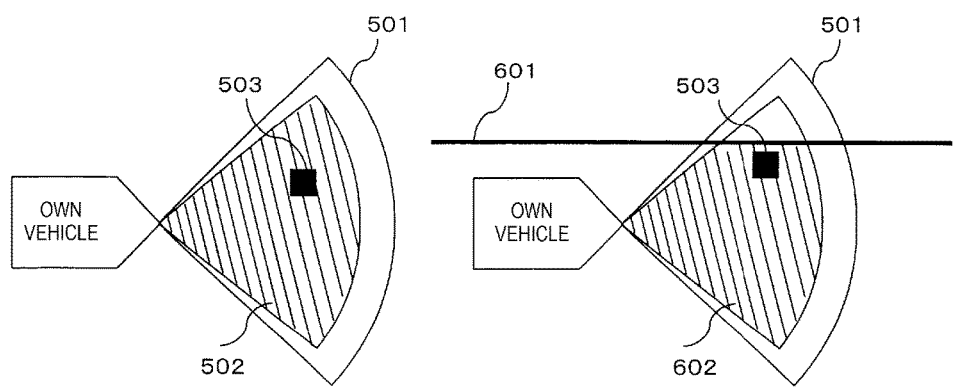
FIGS. 3A and 3B illustrate definition of a region 502.

Embodiments of the invention will be described in detail with reference to the drawings as appropriate.

A. Embodiment 1

FIG. 1 shows an exemplary block diagram of a traffic information providing apparatus in this embodiment. A traffic information providing apparatus 1 in this embodiment mainly includes a data reception unit 101, a storage unit 102, an arithmetic processing unit 103, an input unit 104, an output unit 105, and a data transmission unit 106. Note that those units may be connected to one another via a network such as the Internet or an intranet. This apparatus is provided in, for example, a telematics center and communicates with a plurality of connected cars 113 via the data reception unit 101 and the data transmission unit 106. Note that this communication can be performed at an appropriate timing, e.g., constantly, periodically, or when a state is changed.

The data reception unit 101 is various communication means such as wireless communication and the Internet, receives sensor data from the connected cars 113, and transmits the sensor data to a sensor data storage unit 107.

The storage unit 102 is specifically storage means such as a hard disk and includes the sensor data storage unit 107, a map information storage unit 108, and the like.

The arithmetic processing unit 103 is specifically a CPU (Central Processing Unit) and executes information processing in the traffic information providing apparatus 1. The arithmetic processing unit 103 includes a moving object detection/loss position calculation unit 109, an information addition unit 110, and a driver assistance information preparation unit 111 and executes processing thereof.

The input unit 104 is various input devices such as a keyboard and a mouse and is used when a user performs some input with respect to the traffic information providing apparatus 1.

The output unit 105 is an output device such as a display device and displays processes or results of processing performed by the arithmetic processing unit 103 or a screen for interactive processing or the like for a manager of the traffic information providing apparatus 1.

The data transmission unit 106 transmits driver assistance information 205 output from the arithmetic processing unit 103 to the connected cars 113.

The sensor data storage unit 107 stores the sensor data of the connected cars 113 received by the data reception unit 101.

The map information storage unit 108 stores various kinds of map information such as road shapes, positions of buildings, rivers, and railroads.

The moving object detection/loss position calculation unit 109 receives, as input, sensor data 201 of the connected cars stored in the sensor data storage unit 107, calculates a position at which a sensor of the connected car 113 has detected (for example, has firstly detected) or lost a moving object such as a pedestrian or another vehicle, and outputs the position as a moving object detection/loss position calculation result 202. Note that the moving object detection/loss position calculation unit 109 may calculate not only the position at which the connected car 113 has detected or lost the moving object but also a direction of travel of the connected car and a direction of travel of the moving object at that time, time, and the like and output calculation results as the moving object detection/loss position calculation result 202.

The information addition unit 110 receives, as input, the moving object detection/loss position calculation result 202 and map information 203 stored in the map information storage unit 108, generates information on a poor visibility section (including an invisible section and the like) on the basis of the moving object detection/loss position calculation result 202, adds the information to the map information 203, and outputs the map information as information-added map information 204. Note that the information addition unit 110 may calculate not only the poor visibility section but also a position of a shielding object and the like and output calculation results as the information-added map information.

The driver assistance information preparation unit 111 receives the information-added map information 204 as input and processes the information on the poor visibility section so that the information can be transmitted to the connected cars 113, and outputs the processed information as the driver assistance information 205. Note that the driver assistance information preparation unit 111 may also output, as the driver assistance information 205, not only the poor visibility section but also a specific position of the shielding object, a degree of risk at an intersection or the like, a speed limit and a speed profile in the poor visibility section, and a degree of risk at the intersection or the like at each point of time.

A flow of processing in Embodiment 1 of the traffic information providing apparatus 1 will be described.

FIG. 2 shows a flow of processing in this embodiment.

First, the moving object detection/loss position calculation unit 109 calculates a detection/loss position of a moving object with respect to each of N pieces of sensor data obtained from N connected cars (S301). The detection/loss position of the moving object is calculated as follows by using data of an external sensor such as a stereo camera or a radar of the connected car.

FIG. 3 illustrates definition of a region 502.

The moving object detection/loss position calculation unit 109 defines the region 502 that is the same as or smaller than a sensing region 501 of the external sensor (FIG. 3(*a*)). At this time, in the case where a distance from a road edge 601 is obtained by the external sensor, another sensor, or the like, a region 602 on a road, the region being the same as or smaller than the sensing region 501 of the external sensor, may be defined instead of the region 502 (FIG. 3(*b*)).

In the case where a position at which a moving object 503 has been firstly detected by the external sensor is in the region 502 or 602, the moving object detection/loss position calculation unit 109 records the position as the moving object detection/loss position calculation result 202. Also in the case where a position at which the moving object has been lost is in the region 502 or 602, the moving object detection/loss position calculation unit 109 records the position as the moving object detection/loss position calculation result 202. Note that, regarding the record, detection data and loss data may be distinguished (discriminated) or may not necessarily be distinguished (discriminated).

At this time, in the case where a direction of travel of the vehicle that transmits its own sensor information to the traffic information providing apparatus can be acquired from sensor data or can be calculated on the basis of the sensor data, the moving object detection/loss position calculation unit 109 may also record information thereon as the moving object detection/loss position calculation result 202. In the case where a moving direction of the moving object can be acquired from sensor data or can be calculated on the basis of the sensor data, the moving object detection/loss position calculation unit 109 may also record information thereon as the moving object detection/loss position calculation result 202. In the case where a time at which the moving object has been detected or lost is found, the moving object detection/loss position calculation unit 109 may also record information thereon as the moving object detection/loss position calculation result 202.

Then, the information addition unit 110 estimates a poor visibility section, a position of a shielding object, and the like on the basis of the moving object detection/loss position calculation result 202 and the map information 203, adds the information to the map information, and outputs the map information as the information-added map information 204.

FIG. 4 shows a flow of processing in Step S302. The information addition unit 110 specifically prepares the information-added map information 204 in accordance with the flow of the processing shown in FIG. 4.

First, the information addition unit 110 maps, on a map of the map information 203, moving object detection/loss positions recorded in the moving object detection/loss position calculation result 202 (S701).

Then, the information addition unit 110 deletes, on the basis of a shape of a road and the like obtained from the map information, data of a moving object detection/loss position on the outside of a road on which an own vehicle (vehicle that receives driver assistance information from the traffic information providing apparatus 1) is driven (S702). Note that this processing can be omitted in the case where a distance from a road edge is found as illustrated in FIG. 3(*b*) and the moving object detection/loss position calculation result 202 that does not include a moving object detection/loss position on the outside of the road on which the own vehicle is driven is received as input.

FIG. 5 shows processing in Step S703.

As illustrated in FIG. 5, the information addition unit 110 groups the moving object detection/loss positions mapped on the map so that moving object detection/loss positions close to each other belong to the same group (S703). Any appropriate technique can be used for grouping, and, for example, a clustering technique such as k-means method or a minimum variance average method may be used.

FIG. 6 is a view (1) illustrating processing in Step S704.

As illustrated in FIG. 6, the information addition unit 110 estimates a poor visibility section on the basis of the grouped moving object detection/loss positions (S704). For example, maximum and minimum values of the moving object detection/loss positions in the same group in a coordinate axis defined along a road are acquired, and a section between the two values can be estimated as the poor visibility section.

Figure 7A:
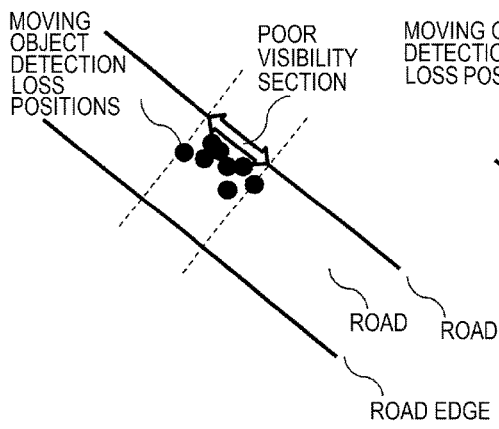
FIGS. 7A and 7B are views (2) illustrating processing in Step S704.
Figure 7B:
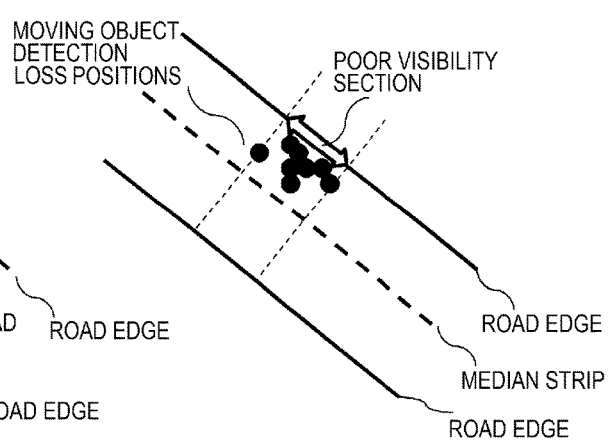

FIG. 7 is a view (2) illustrating processing in Step S704.

In this case, in the case where the moving object detection/loss positions are gathered on one side of a road as illustrated in FIG. 7(*a*), the information addition unit 110 may estimate, as the poor visibility section, only a section in which the moving object detection/loss positions exist. Note that it is possible to determine whether or not the moving object detection/loss positions are gathered on one side by using, for example, information indicating that all the moving object detection/loss positions exist only on one side from a center line of the road. In the case where the moving object detection/loss positions exist only in one lane of two or more lanes of the road as illustrated in FIG. 7(*b*), the information addition unit 110 can estimate only the lane as the poor visibility section.

The information addition unit 110 specifies a position of a shielding object on the basis of the poor visibility section.

FIG. 8 is a view (1) illustrating processing in Step S705.

In the case where only the moving object detection/loss positions are found, as illustrated in FIG. 8, the information addition unit 110 determines that the shielding object exists to surround the poor visibility section (for example, on the outside of the road at a position perpendicular to the road).

Figures 9A, 9B:
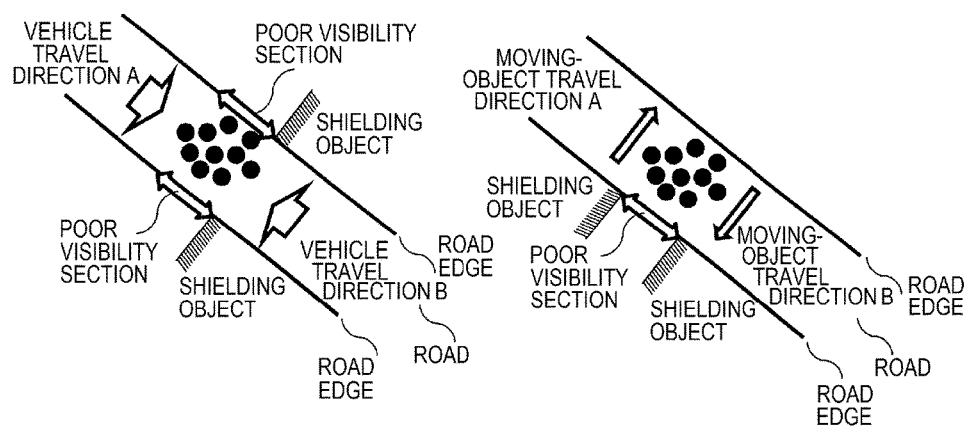
FIGS. 9A and 9B are views (2) illustrating processing in Step S705.

FIG. 9 is a view (2) illustrating processing in Step S705.

In this case, in the case where the moving object detection/loss positions and a direction of travel of a vehicle at the time of detecting or losing moving objects are found, the information addition unit 110 determines that a shielding object is located in front in the direction of travel. For example, in the case where, in a situation illustrated in FIG. 9(*a*), most of directions of travel at the time of detecting or losing the moving objects are a vehicle travel direction B, the information addition unit 110 determines that the shielding object is located in front in the vehicle travel direction.

In the case where the moving object detection/loss positions are found, the detection data and the loss data are distinguished, and moving directions of the moving objects at the time of detecting or losing the moving objects are found, the information addition unit 110 can determine that the shielding object exists ahead of the moving directions of the moving objects on the basis of the detection data or determine that the shielding object exists on an opposite side in the moving directions of the moving objects on the basis of the loss data. For example, in the case where, in a situation illustrated in FIG. 9(*b*), most of the moving directions of the moving objects at the time of detecting the moving objects are a moving-object travel direction A and most of the moving directions of the moving objects at the time of losing the moving object are the moving-object travel direction B, the information addition unit 110 determines that the shielding object is located ahead of the moving-object travel direction B.

Note that, in the case where not only the moving object detection/loss positions but also a time at which the moving objects have been detected or lost is found, the information addition unit 110 can also calculate a frequency of appearance of the moving objects in the poor visibility section at each point of time and output the frequency of appearance as the information-added map information 204.

The driver assistance information preparation unit 111 prepares the driver assistance information 205 on the basis of the information-added map information 204 (S303).

Specifically, for example, the following information can be acquired or calculated as the driver assistance information 205.

(1) The driver assistance information preparation unit 111 may acquire a predetermined image or map data for presenting the shielding object or the poor visibility section added to the information-added map information to a driver and a position thereof.

(2) The driver assistance information preparation unit 111 may calculate, as the driver assistance information 205, a degree of risk or a degree of safety in the poor visibility section on the basis of the position of the shielding object in the poor visibility section and the number of pieces of moving object detection/loss data. In this case, for example, a file storing the degree of risk or safety determined in advance with respect to the position of the shielding object and the number of pieces of the moving object detection/loss data is provided, and the driver assistance information preparation unit 111 can acquire the degree of risk or the degree of safety with reference to this file. Alternatively, the position of the shielding object and/or the number of pieces of the moving object detection/loss data are/is included as parameters and a numerical expression is determined in advance so that the degree of risk is increased or the degree of safety is decreased as a distance between the position of the shielding object and/or the moving object detection/loss data and the own vehicle is decreased and/or the number of pieces of the moving object detection/loss data is increased, and therefore the driver assistance information preparation unit 111 may calculate the degree of risk or the degree of safety by using the numerical expression.

(3) The driver assistance information preparation unit 111 may calculate, as the driver assistance information 205, a recommended speed in the poor visibility section on the basis of the degree of risk or the degree of safety in the poor visibility section, a speed limit in the section, and the like.

For example, in a poor visibility section having a high degree of risk, the driver assistance information preparation unit 111 may calculate, as the recommended speed, a speed at which a vehicle can stop at any time under normal braking. On the contrary, in a section in which visibility is poor but the degree of risk is low, a speed at which a vehicle can stop at least under heavy braking may be calculated as the recommended speed. Specifically, for example, a file or numerical expression defining a predetermined recommended speed in accordance with the degree of risk is provided, and the driver assistance information preparation unit 111 can obtain the recommended speed with reference to the file or numerical expression and therefore obtain the recommended speed and a position of the poor visibility section as the driver assistance information 205.

(4) The driver assistance information preparation unit 111 may calculate, as the driver assistance information 205, a speed profile to which a vehicle needs to conform before and after the poor visibility section on the basis of the recommended speed in the poor visibility section.

FIG. 10 shows generation of the speed profile. For example, as shown in FIG. 10, there may be calculated a speed profile indicating how to decelerate from a current speed so that a vehicle speed is maintained to be equal to or lower than a recommended speed in a poor visibility section.

Note that, on a vehicle side, any one or a plurality of pieces of the driver assistance information 205 can be visibly displayed and/or audibly displayed on a display screen or the like of the own vehicle. Further, automatic driving control may be executed in accordance with the recommended speed and the speed profile.

FIG. 11 illustrates an example where the driver assistance information 205 transmitted by the transmission unit 106 to a connected car is displayed on an information display screen 2301 of the connected car. In FIG. 11, a road shape in the vicinity of a road on which the connected car is driven, an own vehicle position and travel direction 2302, a position of a shielding object 2303, warning 2305, and the like are displayed. The most moving directions of moving objects may be displayed as a running-out direction 2304 on the basis of moving object detection/loss calculation results. As the warning 2305, not only a message for warning a driver, but also a recommended speed, a frequency of appearance of the moving objects, and the like may be displayed.

Note that specific display content of warning 2305, such as sentences, may be directly transmitted as information by the traffic information providing apparatus, or a vehicle may have a correspondence table in which display contents corresponding to various kinds of driver assistance information are stored and acquire a display content in accordance with the corresponding table.

B. Embodiment 2

In this embodiment, an example where driver assistance information is prepared by adding more information to map information with the use of related information such as information on traffic accidents and information on facilities including schools will be described. With this embodiment, it is possible to provide more accurate driver assistance information.

FIG. 12 is a block diagram of Embodiment 2 of the traffic information providing apparatus. Note that, in the traffic information providing apparatus shown in FIG. 12, parts having the same functions as those of configurations denoted by the same reference signs as those in FIG. 1 described above will not be described.

The storage unit 102 is specifically storage means such as a hard disk and includes the sensor data storage unit 107, the map information storage unit 108, a related information storage unit 1601, and the like.

The related information storage unit 1601 stores related information 1701 such as information on traffic accidents and information on facilities including schools.

The information addition unit 110 receives, as input, the moving object detection/loss position calculation result 202, the map information 203, the related information 1701 such as information on traffic accident and information on facilities including schools, and the like and outputs the information-added map information 204.

A flow of processing in Embodiment 2 of the traffic information providing apparatus will be described.

FIG. 13 shows a flow of processing in this embodiment. Note that, in processing of the traffic information providing apparatus shown in FIG. 13, processing that is denoted by the same reference signs as those in FIG. 2 described above and is performed in the same way as the processing in FIG. 2 will not be described.

The information addition unit 110 prepares the information-added map information 204 on the basis of the moving object detection/loss position calculation result 202, the map information 203, and the related information 1701 (S1801). Specifically, the information-added map information 204 is prepared in accordance with a processing procedure shown in FIG. 14.

FIG. 14 shows a flow of processing in Step S1801. Note that processing that is denoted by the same reference signs as those in FIG. 4 described above and is performed in the same way as the processing in FIG. 4 will not be described.

In Step S1901, the information addition unit 110 associates the related information 1701 such as information on traffic accidents and information on facilities including schools in the vicinity of an estimated poor visibility section with the poor visibility section. For example, in the case of information on a traffic accident, the information addition unit 110 associates the information on the traffic accident with a poor visibility section closest to a point of occurrence thereof.

Then, the driver assistance information preparation unit 111 prepares the driver assistance information 205 on the basis of the information-added map information 204. In this embodiment, the driver assistance information preparation unit 111 prepares the driver assistance information 205 for presenting, to a driver, the related information 1701 associated with the poor visibility section together with information on the poor visibility section and a shielding object.

Further, as described in Embodiment 1, the driver assistance information preparation unit 111 may calculate a degree of risk in the poor visibility section on the basis of a position of the shielding object and the number of pieces of moving object detection/loss data in the poor visibility section and the related information 1701.

Furthermore, as described in Embodiment 1, the driver assistance information preparation unit 111 may calculate a recommended speed in the poor visibility section on the basis of the degree of risk or a degree of safety in the poor visibility section, a speed limit in the section, and the like.

FIG. 15 illustrates an example where the driver assistance information 205 transmitted by the transmission unit 106 to a connected car is displayed on the information display screen 2301 of the connected car. In FIG. 15, in addition to the display content in FIG. 11, not only a message for warning a driver as the warning 2401 and a recommended speed, but also related information 2402 is displayed.

C. Embodiment 3

In this embodiment, an example where a position of occurrence of heavy braking is calculated on the basis of sensor data of connected cars and is associated with a poor visibility section will be described. With this embodiment, it is possible to provide driver assistance information containing a degree of risk of, for example, a pedestrian running out into the poor visibility section.

FIG. 16 is a block diagram showing Embodiment 3 of the traffic information providing apparatus. Note that, in the traffic information providing apparatus shown in FIG. 16, parts having the same functions as those of configurations denoted by the same reference signs as those in FIG. 1 described above will not be described.

The arithmetic processing unit 103 is specifically a CPU (Central Processing Unit) and executes information processing in the traffic information providing apparatus 1. The arithmetic processing unit 103 includes the moving object detection/loss position calculation unit 109, the information addition unit 110, the driver assistance information preparation unit 111, and a heavy-braking detection position calculation unit 2001 and executes processing thereof.

The heavy-braking detection position calculation unit 2001 receives, as input, the sensor data 201 of the plurality of connected cars 113 stored in the sensor data storage unit 107, calculates a position where heavy braking has been performed, and outputs a calculation result as a heavy-braking detection position calculation result 2101.

A flow of processing in Embodiment 3 of the traffic information providing apparatus will be described.

FIG. 17 shows a flow of processing in this embodiment. Note that, in processing of the traffic information providing apparatus shown in FIG. 17, processing that is denoted by the same reference signs as those in FIG. 2 described above and is performed in the same way as the processing in FIG. 2 will not be described.

The heavy-braking detection position calculation unit 2001 calculates a position where heavy braking has been performed on the basis of sensor data of N connected cars 113 stored in the sensor data storage unit 107 and outputs a calculation result as the heavy-braking detection position calculation result 2101 (S2201). Specifically, for example, in the case where a minimum value of acceleration in a vehicle travel direction falls below a threshold determined in advance, the heavy-braking detection position calculation unit 2001 determines that heavy braking has been performed, records the position, and outputs the position as the heavy-braking detection position calculation result. At this time, the heavy-braking detection position calculation unit 2001 may also output a time at which the heavy braking has been performed as the heavy-braking detection position calculation result.

Then, the information addition unit 110 extracts information on poor visibility sections and the like from the moving object detection/loss position calculation result 202 and the map information 203, associates information on a heavy-braking detection position of the heavy-braking detection position calculation result 2101 with a poor visibility section closest thereto, and outputs the information as the information-added map information 204.

Then, the driver assistance information preparation unit 111 prepares the driver assistance information 205 on the basis of the information-added map information. In this embodiment, the driver assistance information preparation unit 111 prepares data for presenting, to a driver, the heavy-braking detection position calculation result 2101 associated with the poor visibility section together with information on the poor visibility section and a shielding object. For example, the driver assistance information preparation unit 111 may prepare data for presenting, to a driver, not only the information on the poor visibility section but also the number of times of heavy braking in the vicinity thereof and the like.

Further, in the same way as Embodiment 1, the driver assistance information preparation unit 111 may calculate a degree of risk in the poor visibility section on the basis of a position of the shielding object and the number of pieces of moving object detection/loss data in the poor visibility section and the number of times of heavy braking in the vicinity of the poor visibility section by using a predetermined file or numerical expression to which the number of times of heavy braking has further been added as a parameter. Further, in the case where a time at which heavy braking has been detected is obtained, the driver assistance information preparation unit 111 may calculate a degree of risk at each point of time.

Further, as described in Embodiment 1, the driver assistance information preparation unit 111 may calculate a recommended speed in the poor visibility section on the basis of the degree of risk or a degree of safety in the poor visibility section, a speed limit in the section, and the like.

FIG. 18 illustrates an example where the driver assistance information 205 transmitted by the transmission unit 106 to a connected car is displayed on the information display screen 2301 of the connected car. In FIG. 18, in addition to the display content in FIG. 11, not only the message for warning a driver as the warning 2401 and a recommended speed, but also a degree of risk 2502 calculated on the basis of a frequency of heavy braking is displayed.

D. Effects of Embodiments

According to this embodiment, it is possible to detect a poor visibility intersection or the like on the basis of sensor data of connected cars and distribute information thereon to an advanced driver assistance system and an automatic driving system.

Further, according to this embodiment, it is possible to specify a poor visibility portion by using only a sensor standardly mounted on a connected car without any special measurement device or equipment, and, by providing the information to a driver or an automatic driving device, it is possible to realize control such as preliminary deceleration in the poor visibility intersection or the like.

E. Supplementary Note

Note that the invention is not limited to the above embodiments and includes various modification examples. For example, the above embodiments have been described in detail to easily understand the invention, and therefore the invention is not necessarily limited to the embodiments having all the configurations described above. Further, a part of a configuration of a certain embodiment can be replaced with a configuration of another embodiment, and a configuration of another embodiment can be added to a configuration of a certain embodiment. Further, another configuration can be added to, removed from, or replaced with a part of the configuration of each embodiment.

The above configurations, functions, processing units, processing means, and the like may be realized with hardware by, for example, designing a part or all thereof with an integrated circuit. Further, the above configurations, functions, and the like may be realized with software by a processor interpreting programs realizing the respective functions and executing the programs. Information such as programs, tables, and files realizing the respective functions can be stored in a recording device such as a memory, a hard disk, or an SSD (Solid State Drive) or a recording medium such as an IC card, an SD card, or a DVD.

Control lines and information lines which are considered to be needed for the description are shown, and not all control lines and information lines are necessarily shown for products. It may be considered that substantially all the configurations are actually connected to one another.

REFERENCE SIGNS LIST traffic information providing apparatus 1
data reception unit 101
storage unit 102
arithmetic processing unit 103
input unit 104
output unit 105
data transmission unit 106
sensor data storage unit 107
map information storage unit 108
moving object detection/loss position calculation unit 109
information addition unit 110
driver assistance information preparation unit 111
connected car 113
sensor data 201 of connected car
moving object detection/loss position calculation result 202
map information 203
information-added map information 204
driver assistance information 205

The invention claimed is:
1. A traffic information providing apparatus, comprising:
a moving object detection/loss position calculation unit for calculating a plurality of moving object detection positions at which a moving object is detected and a plurality of moving object loss positions at which detection of the moving object is lost, based on detection and loss data of moving objects received from vehicles by using one or plurality of sensors;
an information addition unit for preparing information-added map information by obtaining a poor visibility section along a road and a position of a shielding object on the outside of the road based on a plurality of moving object detection positions on the road and a plurality of moving object loss positions on the road among the plurality of moving object detection positions and the plurality of moving object loss positions calculated by the moving object detection/loss position calculation unit and adding the poor visibility section and the position of the shielding object to map information stored in advance; and
a driver assistance information preparation unit for preparing driver assistance information containing at least one of the poor visibility section and the position of the shielding object and warning information in the poor visibility section on the basis of the information-added map information prepared by the information addition unit.
2. The traffic information providing apparatus according to claim 1, wherein:
the moving object detection/loss position calculation unit defines, as a target region, a region that is equal to or smaller than a detection region of each sensor or defines, as a target region, a region on a road, the region being equal to or smaller than the detection region of each sensor; and in the case where a position at which the moving object has been firstly detected by each sensor or a position at which detection of the moving object has been lost is in the target region, the moving object detection/loss position calculation unit calculates the position as a first moving object detection/loss position.

3. The traffic information providing apparatus according to claim 1, wherein:

the information addition unit maps the plurality of moving object detection positions and the plurality of moving object loss positions on a map of the map information, groups the plurality of moving object detection positions and the plurality of moving object loss positions mapped on the map so that moving object detection positions and moving object loss positions close to each other belong to a same group based on data of the plurality of moving object detection positions and the plurality of moving object loss positions on the road on which a vehicle that receives the driver assistance information is driven, estimates a region along a road in a vicinity of each grouped group as the poor visibility section, and specifies the position of the shielding object on the outside of the road around one side or both sides of the poor visibility section.

4. The traffic information providing apparatus according to claim 3, wherein:

the information addition unit executes one or more of:

(1) acquiring maximum and minimum values of the plurality of moving object detection positions and the plurality of moving object loss positions in the same group in a coordinate axis defined along the road and estimating a section between the two values as the poor visibility section;

(2) in the case where the plurality of moving object detection positions and the plurality of moving object loss positions are gathered on one side of the road, estimating, as the poor visibility section, a section in which the plurality of moving object detection positions and the plurality of moving object loss positions exist; and (3) in the case where the plurality of moving object detection positions and the plurality of moving object loss positions exist only in one lane of two or more lanes of the road, estimating the lane as the poor visibility section.

5. The traffic information providing apparatus according to claim 3, wherein:

the moving object detection/loss position calculation unit further calculates a direction of travel of each vehicle at the time of detecting or losing detection of the moving objects; and the information addition unit determines that the position of the shielding object is in front in the direction of travel.

6. The traffic information providing apparatus according to claim 3, wherein:

the moving object detection/loss position calculation unit discriminates the detection data and the loss data of the moving objects and further calculates moving directions of the moving objects; and the information addition unit determines that the position of the shielding object is ahead of the moving directions of the moving objects on the basis of the detection data or determines that the shielding object exists on an opposite side in the moving directions of the moving objects on the basis of the loss data.

7. The traffic information providing apparatus according to claim 1, wherein:

the moving object detection/loss position calculation unit acquires or calculates a time at which the moving objects have been detected or detection has been lost;

the information addition unit calculates a frequency of appearance of the moving objects in the poor visibility section at each point of time and adds the frequency to the information-added map information; and the driver assistance information preparation unit adds the frequency of appearance of the moving objects at each point of time to the driver assistance information.

8. The traffic information providing apparatus according to claim 1, wherein:

the driver assistance information preparation unit calculates a degree of risk or a degree of safety in the poor visibility section in proportion to a distance between at least one of the shielding object and the plurality of moving object detection positions and the plurality of moving object loss positions and a vehicle that receives the driver assistance information and a number of the plurality of moving object detection positions and the plurality of moving object loss positions and further adds the degree of risk or the degree of safety to the driver assistance information.

9. The traffic information providing apparatus according to claim 8, wherein:

the driver assistance information preparation unit calculates a recommended speed in the poor visibility section on the basis of the degree of risk or the degree of safety in the poor visibility section and a speed limit in the section and further adds the recommended speed to the driver assistance information.

10. The traffic information providing apparatus according to claim 8, wherein:

the driver assistance information preparation unit calculates, on the basis of the recommended speed in the poor visibility section, a speed profile to which the vehicle that receives the driver assistance information needs to conform before and after the poor visibility section and further adds the speed profile to the driver assistance information.

11. The traffic information providing apparatus according to claim 1, wherein:

the driver assistance information preparation unit prepares and outputs, as the driver assistance information to be displayed on a vehicle that receives the driver assistance information, a road shape in the vicinity of the road on which the vehicle is driven, a position and a direction of travel of the vehicle that receives the driver assistance information, at least one of the position of the shielding object and the poor visibility section, a running-out direction calculated on the basis of moving directions of the moving objects, and warning information containing a predetermined warning message and a recommended speed to an information display screen of the vehicle that receives the driver assistance information.

12. The traffic information providing apparatus according to claim 1, further comprising:

a related information storage unit for storing related information containing at least one of traffic accident information and facility information, wherein:

the information addition unit refers to the related information storage unit and associates the related information in the vicinity of the poor visibility section with the poor visibility section; and the driver assistance information preparation unit further adds the related information associated with the poor visibility section to the driver assistance information.

13. The traffic information providing apparatus according to claim 1, further comprising:

a heavy-braking detection unit for calculating a heavy-braking detection position where heavy braking has been performed on the basis of sensor data of the vehicles, wherein:

the information addition unit further associates the heavy-braking detection position with a close poor visibility section and prepares the heavy-braking detection position as the information-added map information; and the driver assistance information preparation unit further adds a degree of risk calculated on the basis of the number of times of heavy braking or a frequency of heavy braking to the driver assistance information on the basis of the information-added map information.

14. A traffic information providing system, comprising:

a data reception unit for receiving sensor data from vehicles;

a map information storage unit for storing map information;

a processing unit for receiving the sensor data from the data reception unit as input, receiving the map information from the map information storage unit as input, and preparing driver assistance information; and a data transmission unit for visibly displaying and/or audibly displaying the driver assistance information prepared by the processing unit on a target vehicle, wherein the processing unit includes a moving object detection/loss position calculation unit for calculating a plurality of moving object detection positions at which a moving object is detected and a plurality of moving object loss positions at which detection of the moving object is lost, based on detection and loss data of moving objects received from the vehicles by using one or plurality of sensors, an information addition unit for preparing information-added map information by obtaining a poor visibility section along a road and a position of a shielding object on the outside of the road based on a plurality of moving object detection positions on the road and a plurality of moving object loss positions on the road among the plurality of moving object detection positions and the plurality of moving object loss positions calculated by the moving object detection/loss position calculation unit and adding the poor visibility section and the position of the shielding object to the map information stored in advance, and a driver assistance information preparation unit for preparing the driver assistance information containing at least one of the poor visibility section and the position of the shielding object and warning information in the poor visibility section on the basis of the information-added map information prepared by the information addition unit.

15. A traffic information providing method, comprising:

calculating a plurality of moving object detection positions at which a moving object is detected and a plurality of moving object loss positions at which detection of the moving object is lost, based on detection and loss data of moving objects received from vehicles by using one or plurality of sensors;

preparing information-added map information by obtaining a poor visibility section along a road and a position of a shielding object on the outside of the road based on a plurality of moving object detection positions on the road and a plurality of moving object loss positions on the road among the plurality of moving object detection positions and the plurality of moving object loss positions and adding the poor visibility section and the position of the shielding object to map information stored in advance; and preparing driver assistance information containing at least one of the poor visibility section and the position of the shielding object and warning information in the poor visibility section on the basis of the information-added map information.

* * * * *